United States Patent [19]

Maklad et al.

[11] 4,354,736
[45] Oct. 19, 1982

[54] STRESS-INDUCED BIREFRINGENT SINGLE MODE OPTICAL FIBER AND A METHOD OF FABRICATING THE SAME

[75] Inventors: Mokhtar S. Maklad, Milford, Conn.; Francis I. Akers, Roanoke, Va.; William L. Thomas, Midvale, Utah

[73] Assignee: International Telephone and Telegraph Corporation, New York, N.Y.

[21] Appl. No.: 160,698

[22] Filed: Jun. 18, 1980

[51] Int. Cl.³ .............................................. G02B 5/172
[52] U.S. Cl. ................................. 350/96.32; 65/3.11; 350/96.30
[58] Field of Search ............... 350/96.29, 96.30, 96.31, 350/96.32, 96.33, 96.34; 65/3.1, 3.11, 3.12

[56] References Cited

U.S. PATENT DOCUMENTS

| Re. 28,664 | 12/1975 | Miller | 350/96.33 X |
|---|---|---|---|
| 3,950,073 | 4/1976 | Horiguchi et al. | 350/96.33 |
| 4,179,189 | 12/1979 | Kaminow et al. | 350/96.33 |
| 4,184,859 | 1/1980 | Maklad | 65/3.12 X |
| 4,274,854 | 6/1981 | Pleibel et al. | 350/96.31 X |
| 4,307,938 | 12/1981 | Dyott | 350/96.30 |

Primary Examiner—John D. Lee
Attorney, Agent, or Firm—John T. O'Halloran; Alfred C. Hill

[57] ABSTRACT

The stress-induced birefringent single mode optical fiber includes an optical core having a high refractive index and a high thermal expansion coefficient. An arrangement formed from an optical material having a low refractive index and a low thermal expansion coefficient is disposed to engage the outer surface of the core tangentially at opposite ends of a diameter of the core to establish a stress therein. Air encompasses the remainder of the outer surface of the core to provide a light guiding cladding for the core and, hence, the fiber itself. The arrangement to establish the stress may include a pair of flat plates engaging the outer surface of the core tangentially which are entrapped in a circular tube which is concentric with the core such that air is entrapped between the plates and the circular tube to provide the light guiding cladding. Alternatively, an elliptical tube is provided to engage the outer surface of the core at the minor axis of the elliptical tube to provide the desired stress in the fiber. In this case air is enclosed in the elliptical tube to provide the light guiding cladding.

10 Claims, 7 Drawing Figures

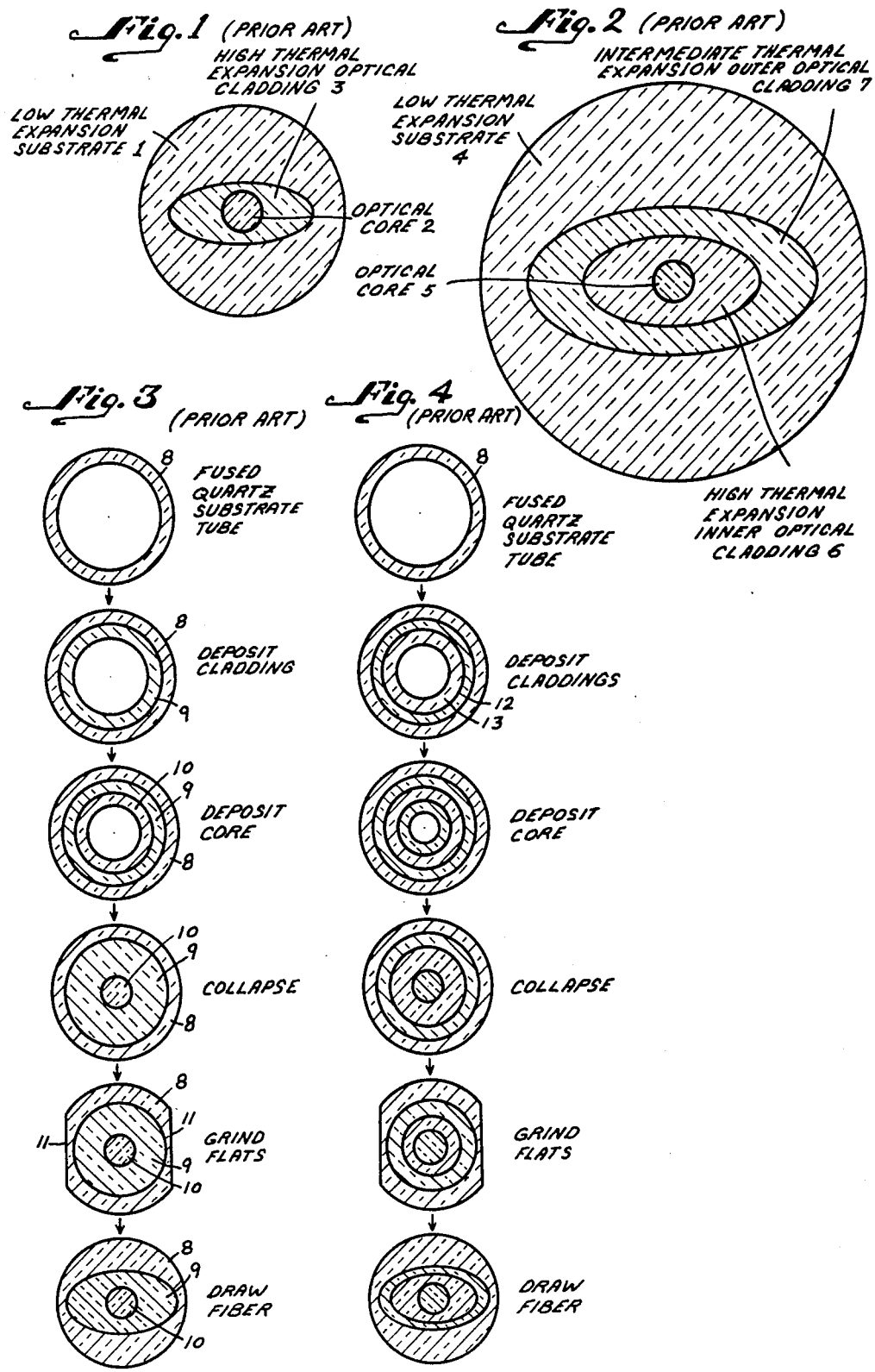

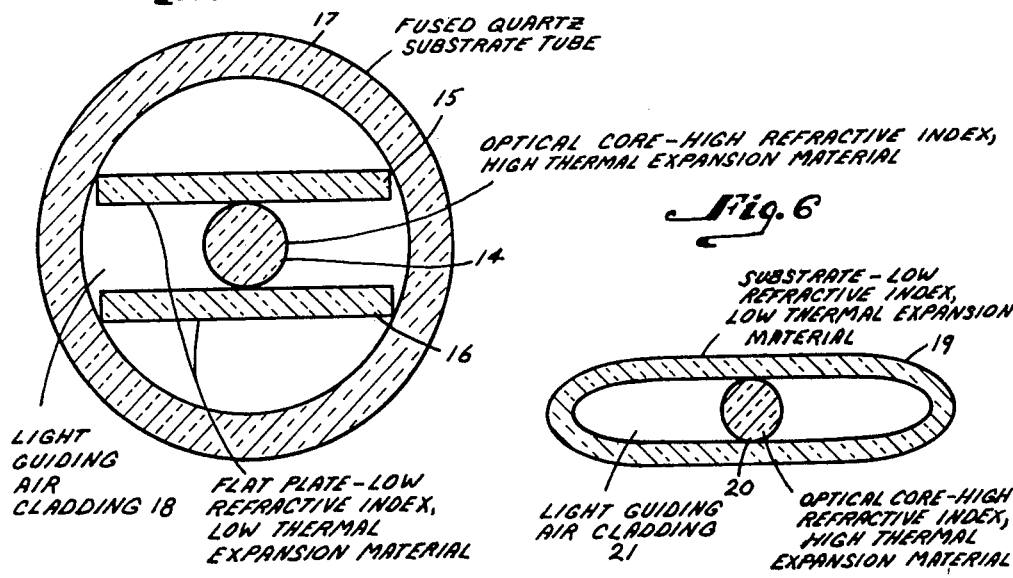
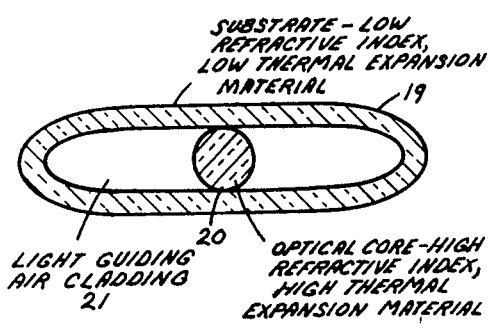
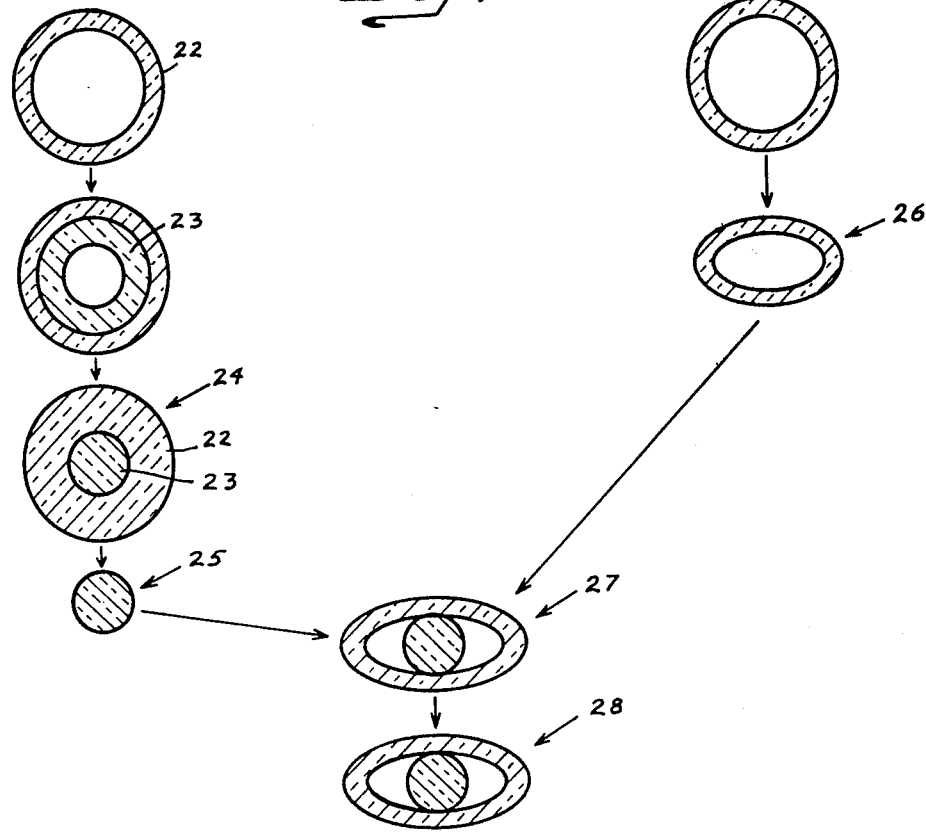

STRESS-INDUCED BIREFRINGENT SINGLE MODE OPTICAL FIBER AND A METHOD OF FABRICATING THE SAME

BACKGROUND OF THE INVENTION

The present invention relates to optical fibers and more particularly to stress-induced birefringent single mode optical fibers.

A single-mode optical waveguide with a core of circular cross section supports the $HE_{11}$ hybrid mode. The polarization of this mode can be resolved into two orthogonal components. When the circularity of the core is perfect, and is maintained along the fiber length, the propagation coefficients of the modes in the two orthogonal directions are exactly the same. The polarization of the mode as it propagates along the fiber should be retained, i.e., at the fiber output the polarization of the mode should be predominantly in one direction if it is so launched at the input. However, it has been observed experimentally that the output polarization of a nominally circular fiber injected by a linearly polarized light is unpredictable due to minor irregularities in the fiber and to changes in environmental conditions. This is because inherent birefringence removes the degeneracy between the two orthogonal polarizations of the fundamental mode, and any strain or imperfections which are either built into the fiber or introduced by bending, twisting or mounting, will lead to power coupling between these two polarizations. Therefore, the state of polarization at the fiber output is arbitrary and can, in fact, vary with time in response to temperature and pressure changes along the fiber length.

This variation with time of the state of polarization becomes a serious problem in connectoring of single mode fibers and polarization sensitive devices, such as optical multiplexers, switches, and fiber acoustic and inertial rotation sensors.

The general approach to maintain linear polarization in a single mode fiber is to increase fiber birefringence to reduce coupling of power between the two polarizations.

In earlier fiber work, breaking the circular symmetry of the core to remove the degeneracy of the two polarizations of the fundamental mode was suggested and observed. Recently, however, it has been reported that only slight improvement in polarization performance is observed using fibers having extremely elliptical cores. It has also been suggested that anisotropic strain is a more dominant factor than noncircular geometry for maintaining linear polarization over long fiber length and that geometrical ellipticities in a dielectric waveguide have only a minor effect on the difference in propagation constant for the two modes of polarization. Therefore, strain birefringence must be introduced to raise the difference in propagation constants.

Birefringent single mode fibers which maintain linear polarization have been made. The birefringence was introduced by breaking the circular symmetry of the strain in the elliptical optical cladding. This anisotropic cladding strain was produced by total or partial flat grinding of the silica on two sides of a single mode preform. During drawing, surface tension causes the fiber to be circular, resulting in an elliptical cladding and an almost circular core. The high silica core remains essentially round as a result of the high softening point. The birefringence depends not only on the cladding ellipticity, but also on the thermal expansion coefficients of the cladding and jacketing glasses.

Most of the anisotropic strain in the cladding makes only a small contribution to the birefringence of the fiber, since most of the light power is confined to the core, or the portion of the cladding immediately adjacent to the core. This is especially true for high NA (numerical aperture) fibers. To further increase birefringence, single mode fibers with two optical claddings have been developed. In the two cladding fibers, the strain is concentrated closer to the core by increasing the boron concentration closer to the core and by decreasing the concentration in the rest of the cladding.

The two cladding fiber was the best fiber for maintaining linear polarization, and was also the most birefringent fiber. When light was injected along either principal axis, the light output from this fiber was better than 99% after 70 meters. No significant depolarization was observed during twisting the fiber several times and bending it to a radius of a few millimeters. The birefringence in this fiber, expressed as a refractive index difference between the two axes was $\delta\eta = 4.3 \times 10^{-5}$. Fibers with $\delta\eta = 1 \times 10^{-5}$ will maintain polarization only if handled with extreme care.

The elliptical cladding is extremely useful in locating the principal axes, in addition to causing the birefringence.

It has been observed that a single cladding birefringent single mode fiber maintained polarization when bent, but depolarization was observed when the fiber was twisted. In a two cladding single mode fiber, however, polarization was maintained under bending and twisting conditions.

SUMMARY OF THE INVENTION

An object of the present invention is to provide an improved stress-induced birefringent single mode optical fiber.

Another object of the present invention is to provide an improved stress-induced birefringent single mode optical fiber with increased stress induced birefringence.

A further object of the present invention is to provide single polarization, single mode optical fibers which are insensitive to changes in ambient conditions and to handling.

A feature of the present invention is the provision of a stress-induced birefringent single mode optical fiber comprising: an optical core having a high refractive index and a high thermal expansion coefficient; means formed from an optical material having a low refractive index and a low thermal expansion coefficient engaging the outer surface of the core tangentially at opposite ends of a diameter of the core to establish a stress therein; and air encompassing the remainder of the outer surface of the core to provide a light guiding cladding.

Another feature of the present invention is the provision of a method of fabricating a stress-induced birefringent single mode optical fiber comprising the steps of producing an optical core from an optical material having a high refractive index and a high thermal expansion coefficient; placing the core in an optical component formed from an optical material having a low refractive index and a low thermal expansion coefficient to enable the component to engage the outer surface of the core tangentially at opposite ends of a diameter of the core to establish a stress therein; entrapping air in the component to provide a light guiding cladding for the core when placed in the component; and drawing the core and the component after assembly to provide the fiber.

BRIEF DESCRIPTION OF THE DRAWING

Above-mentioned and other features and objects of this invention will become more apparent by reference to the following description taken in conjunction with the accompanying drawings, in which:

FIG. 1 is a transverse cross sectional view of a prior art single layer cladding type stress-induced birefringent single mode optical fiber;

FIG. 2 is a transverse cross sectional view of a prior art two-layer cladding type stress-induced birefringent single mode optical fiber;

FIG. 3 is a flow diagram of the prior art method of fabricating the fiber in FIG. 1;

FIG. 4 is a flow diagram of the prior art method of fabricating the fiber of FIG. 2;

FIG. 5 is a transverse cross sectional view of a first embodiment of a preform employed in producing a stress-induced birefringent single mode optical fiber in accordance with the principles of the present invention;

FIG. 6 is a transverse cross sectional view of a second embodiment of a preform for producing a stress-induced birefringent single mode optical fiber in accordance with the principles of the present invention; and FIG. 7 is a flow diagram of a method of fabricating the optical fiber of FIG. 6 in accordance with the principles of the present invention.

DESCRIPTION OF THE PREFERRED EMBODIMENTS

In order to clearly demonstrate the improvement presented by the optical fibers of the present invention, the prior art birefringent single mode optical fibers will be discussed in more detail.

Referring to FIG. 1, there is illustrated there a transverse cross sectional view of a single layer cladding type stress-induced birefringent single mode optical fiber known in the prior art. The substrate 1 and optical core 2 are essentially circular. However, the optical cladding 3, made of high thermal expansion optical material is elliptical. Birefringence resulting from mismatch of thermal expansion in substrate 1 and cladding 3 is dependent on the composition of core 2 and cladding 3, as well as on the ratio of the thickness of substrate 1 and optical cladding 3. The birefringent effects are maximum along the minor axis of optical cladding 3 where the stresses are maximum. Also, the mismatched substrate-cladding interface is closest to core 2 along this axis. Glass compositions will be varied to increase the birefringence $\Delta\eta$ and to increase the difference $\Delta B$ between the propagation constants of the two orthogonal polarizations of the fundamental mode.

Referring to FIG. 2, there is illustrated therein a transverse cross section of a two-layer cladding type stress-induced birefringent single mode optical fiber in accordance with the prior art. This fiber includes an essentially circular outer diameter for substrate 4, made of low thermal expansion optical material, and an optical core 5. This fiber includes two elliptical claddings, namely, an inner optical cladding 6 made from high thermal expansion optical material and an outer optical cladding 7 made from an intermediate thermal expansion optical material.

Inner cladding 6 is a high boron content borosilicate glass while outer cladding 7 is a low boron content borosilicate glass. In addition to the birefringence due to substrate 4—outer cladding 7 mismatch, birefringence is also due to the thermal expansion mismatch between the two claddings 6 and 7. The birefringence produced by the two-cladding approach has a stronger effect on propagation constants for the two orthogonal polarizations as compared to that of the one-cladding fiber design, and hence a larger $\delta\eta$. $\delta\eta$ will be increased by modifying the dopant level in both optical claddings and by varying the thickness of both claddings without compromising the optical transmission characteristics of the optical fiber.

The fabrication technique for both of the fibers of FIGS. 1 and 2 basically include depositing the cladding and core materials from the vapor phase inside a tubular fused quartz substrate which is then collapsed into a solid preform and drawn into a fiber of the desired diameter.

Referring more specifically to FIG. 3, the fiber of FIG. 1 is produced in the following manner. A 15 millimeter outer diameter X a 13 millimeter inner diameter precision bore natural fused quartz tubing 8 was used in the preform fabrication.

To produce a strong fiber, dust and other particulate contaminants are prevented from settling onto the substrate surface during deposition and substrate collapsing. Inclusions, bubbles and other surface contaminants have been proven to cause localized stresses which can result in fiber breakage during proof testing. Therefore, the substrate material will be a high grade natural silica which is virtually inclusion and bubble free.

For the formation of cladding and core layers, high purity chemicals will be deposited in oxide form onto substrate tube 8 as shown at 9 and 10. To achieve accurate and uniform composition and minimum fluctuations in the single-mode fiber diameter and core size, mass flow control of deposition and torch gasses are employed. Because of the large high-purity borosilicate cladding thickness needed to contain the field, many passes of chemical deposition are required. Helium gas and diphosphorous pentoxide dopant are added to increase the reaction efficiency and reduce the fining temperature, and, thus, prevent deformation and premature collapse of substrate tube 8 during the lengthy deposition time. The lower firing temperature also reduces the periodic fluctuations in the index of refraction between deposited layers. Since the induced stress in the preform is influenced by the thermal expansion characteristics of the cladding glass, and these characteristics are in turn determined by the types of dopants and their concentrations, adjusting the chemical flows will determine the fiber properties. To achieve fiber core 10 uniformity, the core deposition will be done in several passes, while maintaining the core dimension needed for single mode guiding. Once deposition is completed, substrate 8 is collapsed into a solid preform. To produce stress-induced birefringence, circular preform 8 is then precision ground along two opposite sides as shown at 11 in FIG. 3. The grinding operation will be performed in a manner that the two ground flats are parallel to one another and to the preform core 10.

During the fiber drawing operation, the drawn fiber will assume a round cross section, whereas the cladding layer 9 will become oval or elliptical. The cladding ovalness can be altered by the amount of substrate material removed during the grinding process. To further increase birefringence, it may be useful to collapse a second substrate over the preform before it is ground.

Referring to FIG. 4, there is illustrated therein the flow diagram of a prior art method of fabricating the two cladding optical fiber of FIG. 2. The method of FIG. 4 starts with a substrate tube 8 similar to the method of FIG. 3. In this method two cladding layers will be deposited into a 15 millimeter—13 millimeter natural fused quartz substrate. These two cladding layers are layers 12 and 13 in the second step of FIG. 4. From this point on the process of FIG. 4 is identical with that of FIG. 3. To achieve a greater thermal mismatch between the core and cladding glasses, the amount of boron oxide doping will be increased for the inner cladding 13. The induced stress will be affected by the individual cladding thickness and compositions. The collapsed preform will again be ground to form two parallel and opposing flats, exactly as in the case for the single cladding layer method of FIG. 3.

Referring to FIG. 5, there is illustrated therein a transverse cross section of a preform used in providing a single-mode optical fiber having stress-induced birefringence in accordance with the principles of the present invention. The preform is made by placing a core rod 14 with a high refractive index and high thermal expansion coefficient between two flat plates 15 and 16 made out of low refractive index, low thermal expansion material. This composite structure is placed inside a silica tube 17 as illustrated and tacked together. The preform as shown in FIG. 5 is then drawn to the desired fiber outside diameter. When forming the preform as shown in FIG. 5 and also after the preform has been drawn to the desired fiber outside diameter, air is entrapped between plates 15 and 16 and tube 17 to provide a light guiding air cladding 18 for the optical fiber. The stresses to increase the birefringence are produced at the points where plates 15 and 16 contact or engage core 14 on opposite ends of a diameter of core 14.

Referring to FIG. 6, there is illustrated therein a transverse cross sectional view of another preform that may be employed to provide the stress-induced birefringent single-mode optical fiber in accordance with the principles of the present invention. The cladding tube 19 is collapsed into an oval or elliptical shape into which the optical core 20 is inserted and tacked in place. Tube 19 is made of low refractive index, low thermal expansion material and optical core 20 is made of high refractive index, high thermal expansion material. Air is entrapped in tube 19 to provide a light guiding air cladding 21 for the fiber. The tacking of the core 21 to tube 19 is at the minor axis of tube 19 and, hence, the resulting fiber. A large $\Delta \eta$ is obtainable from this type of fiber preform because of the high thermal expansion mismatch at the core-substrate interface.

Referring to FIG. 7, there is illustrated therein a flow chart for the fabrication of the fiber of FIG. 6. This process enables the achievement of a high stress between core 20 and cladding or substrate tube 19 by increasing the thermal expansion coefficient of the core 20 relative to tube 19. To fabricate core 20, a large core step index preform is provided by employing a pure silica substrate 22 which has deposited on the inner surface thereof the core material 23. The tube 22 is collapsed as shown at 24 with the substrate 22 then being chemically etched or otherwise removed to leave intact the core material 23 which is then drawn into a large diameter fiber as shown at 25. This fiber 25 will be inserted into a high grade fused quartz substrate which has been collapsed into an oval shape as shown at 26. The substrate 26 is further collapsed until it contacts fiber core 25 at opposite points thereof as shown at 27. The preform as shown at 27 is then drawn into a flat fiber which will help identify the polarization axis as shown at 28. The thermal mismatch will be controlled by the amount and type of dopants in the starting step index preform.

The fibers resulting from the preforms of FIGS. 5 and 6 have strong stress-induced birefringence between the core and cladding which results in a decrease of the beat length, a decreased polarization sensitivity to environment and the maintenance of linear polarization.

While we have described above the principles of our invention in connection with specific apparatus it is to be clearly understood that this description is made only by way of example and not as a limitation of the scope of our invention as set forth in the objects thereof and in the accompanying claims.

We claim:

1. A stress-induced birefringent single mode optical fiber comprising:
    an optical core having a high refractive index and a high thermal expansion coefficient;
    means formed from an optical material having a low refractive index and a low thermal expansion coefficient engaging the outer surface of said core tangentially at opposite ends of a diameter of said core to establish a stress therein; and
    air encompassing the remainder of the outer surface of said core to provide a light guiding cladding.

2. A fiber according to claim 1, wherein
    said means includes
        a pair of flat plates each having one surface engaging the outer surface of said core tangentially at a different end of said diameter, and
        a circular tube concentric with said core enclosing said core and said pair of flat plates, the inner surface of said circular tube engaging both ends of each of said pair of flat plates.

3. A fiber according to claim 2, wherein
    said air is disposed between said pair of flat plates to provide said light guiding cladding.

4. A fiber according to claim 1, wherein
    said means includes
        an elliptical tube having its inner surface at its minor axis engaging the outer surface of said core tangentially at opposite ends of said diameter.

5. A fiber according to claim 4, wherein
    said air is disposed in said elliptical tube.

6. A method of fabricating a stress-induced birefringent single mode optical fiber comprising the steps of:
    producing an optical core from an optical material having a high refractive index and a high thermal expansion coefficient;
    placing said core in an optical component formed from an optical material having a low refractive index and a low thermal expansion coefficient to enable said component to engage the outer surface of said core tangentially at opposite ends of a diameter of said core to establish a stress therein;
    entrapping air in said component to provide a light guiding cladding for said core when placed in said component; and
    drawing said core and said component after assembly to provide said fiber.

7. A method according to claim 6, wherein
    said step of placing includes the steps of placing said core between a pair of flat optical plates having a low refractive index and a low thermal expansion coefficient, one surface of each of said pair of plates engaging the outer surface of said core tangentially at a different end of said diameter, inserting said core and said pair of plates after assembly coaxially into a circular optical tube, and tacking the assembly of said core and said pair of plates in place in said circular tube.

8. A method according to claim 7, wherein said air is entrapped in said circular tube between said pair of plates.

9. A method according to claim 6, wherein said step of placing includes the steps of inserting said core coaxially into an elliptical tube having a low refractive index and a low thermal coefficient of expansion, said elliptical tube having its inner surface at its minor axis engaging the outer surface of said core tangentially at opposite ends of said diameter, and tacking said core in place within said elliptical tube.

10. A method according to claim 9, wherein said air is entrapped in said elliptical tube.

* * * * *